(12) United States Patent
Mindl et al.

(10) Patent No.: US 6,975,390 B2
(45) Date of Patent: Dec. 13, 2005

(54) OPTOELECTRONIC MONITORING DEVICE FOR A MOTOR VEHICLE

(75) Inventors: Anton Mindl, Lüdenscheid (DE); Frank Bläsing, Werl (DE); Thomas Weber, Lüdenschid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 812 days.

(21) Appl. No.: 09/948,000

(22) Filed: Sep. 6, 2001

(65) Prior Publication Data

US 2005/0057364 A1 Mar. 17, 2005

Related U.S. Application Data

(63) Continuation of application No. PCT/EP00/00182, filed on Jan. 13, 2000.

(30) Foreign Application Priority Data

Mar. 6, 1999 (DE) .................. 199 09 986

(51) Int. Cl.$^7$ .................. G01J 1/00; G01J 1/42
(52) U.S. Cl. .................. 356/213; 356/218; 356/225
(58) Field of Search .................. 356/213, 218, 356/222, 227, 233, 225; 250/208.1, 208.2, 250/208.4, 227.24, 227.25, 206.1, 206.2, 250/206.4

(56) References Cited

U.S. PATENT DOCUMENTS 3,947,131 A * 3/1976 Karl .................. 356/445
4,015,122 A    3/1977 Rubinstein
4,383,170 A    5/1983 Takagi et al.
5,076,697 A * 12/1991 Takagi et al. .................. 356/603
6,175,407 B1 * 1/2001 Sartor .................. 356/71
6,330,519 B1 * 12/2001 Sawatari .................. 702/127
6,806,452 B2 * 10/2004 Bos et al. .................. 250/208.1
2002/0135468 A1 * 9/2002 Bos et al. .................. 340/436

FOREIGN PATENT DOCUMENTS

| DE | 29 41 739 B1 | 4/1981 |
| DE | 197 04 818 A1 | 8/1997 |
| DE | 197 30 341 A1 | 1/1999 |
| EP | 0551984 A1 | 7/1993 |
| EP | 0708325 A1 | 4/1996 |
| EP | 0832798 A2 | 4/1998 |

* cited by examiner

Primary Examiner—Michael P. Stafira
(74) Attorney, Agent, or Firm—Brooks Kushman P.C.

(57) ABSTRACT

A motor vehicle optoelectronic monitoring device includes a sensor, imaging systems, a shutter, and a controller. Each sensor element outputs a sensor element signal based on the intensity of a light signal received by the sensor element. Each imaging system is associated with a sensor region and illuminates an object to monitor the object. Two sensor regions associated with two respective imaging systems partially overlap one another. Each imaging system illuminates the sensor elements of the associated sensor region with a light signal indicative of the object being monitored. The controller controls the shutter unit to selectively enable and disable illumination of the sensor by the imaging systems. The controller processes the sensor element electric signals output by the sensor elements in response to illumination by an imaging system to determine conditions of the object being monitored by the imaging system.

12 Claims, 4 Drawing Sheets

OPTOELECTRONIC MONITORING DEVICE FOR A MOTOR VEHICLE

CROSS-REFERENCE TO RELATED APPLICATIONS

This is a continuation of International Application PCT/EP00/00182, with an international filing date of Jan. 13, 2000.

BACKGROUND OF THE INVENTION

1. Field of the Invention

The present invention relates to an optoelectronic monitoring device for a motor vehicle.

2. Background Art

Such a monitoring device is known from, e.g., EP 0 832 798 A2. This monitoring device is used as a rain sensor and includes an imaging system for imaging water drops on a section of the windshield of a motor vehicle onto a camera sensor. The imaging system has a lens pointed from the interior of the motor vehicle towards the windshield. The lens is focused on the detected windshield section. The camera sensor is positioned in the region of the interior rearview mirror looking forward in the direction of travel. The detected image data is evaluated by a processing unit. The processing unit controls a wiping motor as a function of the detected image data.

With the imaging system and the camera sensor, it is only possible to detect water drops on the windshield of a motor vehicle. In the automotive field, optical sensors are also used to detect additional optical information. For example, such sensor systems can be applied to the detection of the position of the sun, to the control of headlights, or to the monitoring of the motor vehicle interior. All of these systems use photoelectric sensor arrays and corresponding imaging systems.

SUMMARY OF THE INVENTION

Starting with this discussed state of the prior art, the object of the present invention is based on disclosing an optoelectronic monitoring device that allows different optical information to be detected by various optical sensor systems.

This object is realized according to the present invention by an optoelectronic monitoring device for a motor vehicle, where this device comprises:

several optical imaging systems that are associated with different objects to be monitored and whose outputs are incident on the photosensitive surface of a common photoelectric sensor array which comprises a plurality of photoelectric converter elements forming individual pixels, and each converter element generates an electric signal corresponding to the light intensity as a function of the received light, wherein the output of each imaging system is arranged on a region of the photosensitive surface of the sensor array for imaging the optical information prepared by this imaging system, and this region at least partially overlaps the illuminated regions of the other imaging systems, a shutter unit that is arranged in the beam path of each imaging system and that can be electrically controlled by means of an electro-optical effect for controlling illumination of the photosensitive surface of the sensor array by this imaging system, and a controller that receives the electrical output signals of the sensor array for controlling the shutter unit, for evaluating the optical information, and for controlling actuators as a function of the result of evaluating the information associated with the object.

Due to the monitoring device according to the present invention, which includes several imaging systems that are advantageously carried by a common holder, this monitoring device can be used for the different optical systems by using a single sensor array. Possible imaging systems are image-forming systems, such as lenses, or light-transmitting systems. A certain converter element group of the sensor array can be allocated to the output of each imaging system, so that it is possible for there to be a clear allocation of certain group signals to certain imaging systems, and thus to certain optical information to be detected. The converter element group of the sensor array allocated to an imaging system at least partially overlaps that of another imaging system. Thus, it is advantageous for the size of the sensor array to be defined by the largest imaging size required by an imaging system, and for all additional imaging systems to also illuminate the photosensitive surface of the sensor array in this region. This has the consequence that the size of the sensor array, where preferably a camera sensor chip is used, can be designed correspondingly small in spite of the numerous sets of optical information imaged on the array.

For clocking the illumination of the sensor array by the individual imaging systems, an electronically controlled shutter is mounted in the beam path of each imaging system. The shutter unit operates by means of an electro-optical effect and thus can be designed functionally, e.g., as a liquid-crystal shutter or according to an electrochromic principle. The clocked imaging of optical information for different imaging systems on the sensor array can be used as coding for identifying the optical information of a certain imaging system. In contrast with coding by a converter element group allocated to a certain imaging system, an allocation of the received optical information to an imaging system can be independent of the actual region of the sensor array illuminated by the imaging system.

The individual imaging systems are combined in the region of the photoelectric sensor array advantageously into a discrete unit and fixed on the circuit carrier of the sensor array, so that the sensor array is held in a fixed position relative to the outputs of the imaging systems.

By equipping a photoelectric sensor array used in a motor vehicle with a lens as one of the imaging systems, the system can be used to detect image-forming information. Therefore, such a system can be used, e.g., as an interior monitoring system or also for monitoring the surroundings of the motor vehicle, such as for receiving signals of distance or rain sensors.

Due to the time-clocked imaging of the optical information of individual imaging systems, such information that is not continuous, but instead that is only prepared when necessary, can also be evaluated by the sensor array. For example, an image-forming imaging system can be used as jamming protection for preventing objects from becoming caught when closing an electronically controlled sunroof. This monitoring device is then only in monitoring function when the sunroof is actually being closed. Only during the time interval required for closing the sunroof is the photosensitive surface of the sensor array illuminated with optical information. The control of the individual shutter units and the evaluation of the received optical information is done by a controller.

For using this sensor array for interior monitoring, it is advantageous to position such a sensor array in the region of the inner rear-view mirror or in the region of a ceiling console, such as a ceiling module, looking backwards. Additional optical information can be supplied to the sensor array by optical waveguides as additional imaging systems, wherein individual fibers can be used to transmit light intensity or fiber bundles can be used to transmit image-forming information.

Such a photoelectronic sensor array with multi-functional optics formed by combining different imaging systems can also be arranged at another position in a motor vehicle. The optical information supplied to the sensor array can be filtered already relative to the actual information to be detected. Because the sensor array can be configured to receive a large frequency bandwidth, such a sensor array can be used simultaneously for different optical sensors.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
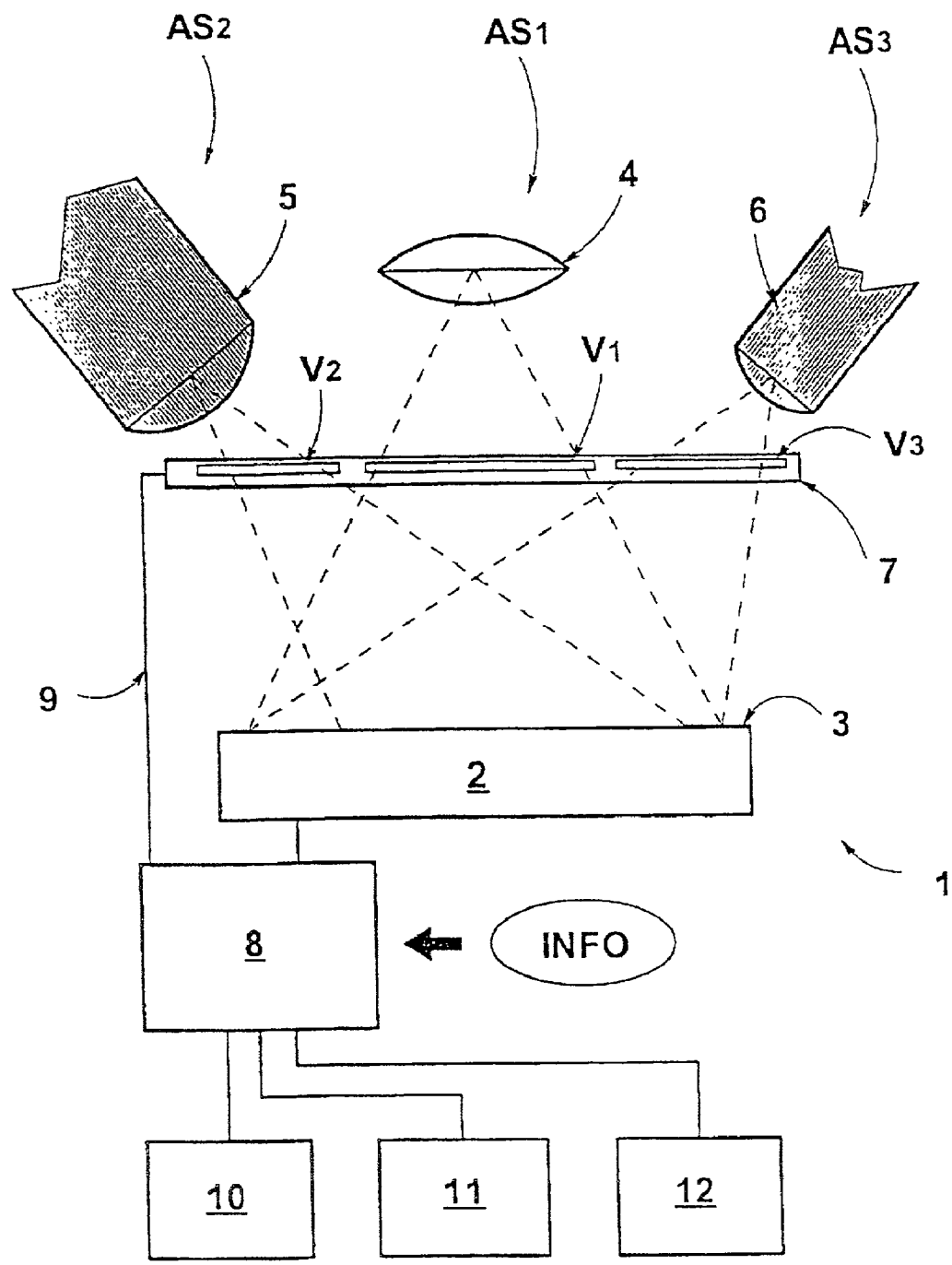
FIG. 1 illustrates a schematic representation of an optoelectronic monitoring device for a motor vehicle according to a block circuit diagram.

An optoelectronic monitoring device 1 in accordance with the present invention includes a camera sensor (sensor array) 2 having a photosensitive surface 3 where several imaging systems $AS_1$–$AS_3$ image the optical information prepared by these imaging systems $AS_1$–$AS_3$. Imaging system $AS_1$ includes an imaging unit having a convex lens 4. Imaging systems $AS_2$ and $AS_3$ are similar image-forming systems, which guide the image information by means of fiber bundles 5 and 6 to camera sensor 2. The camera-side ends of fiber bundles 5 and 6 are convex for better imaging of the prepared image information. Likewise, a lens is allocated to the input-side end of fiber bundles 5 and 6.

Imaging systems $AS_1$ and $AS_3$ illuminate the same region of photosensitive surface 3 of camera sensor 2. Imaging system $AS_2$ illuminates only a portion of the sensor region illuminated by imaging systems $AS_1$ and $AS_3$.

A shutter unit 7 is inserted in the beam path of imaging systems $AS_1$–$AS_3$, and this shutter unit is segmented in a number of shutter fields $V_1$–$V_3$ that corresponds to the number of imaging systems $AS_1$–$AS_3$. Shutter unit 7 is designed as a liquid-crystal shutter with shutter fields $V_1$–$V_3$ that can be switched individually and independently of each other electrically between their light-transmitting and light-blocking positions.

The clocked dependent control of shutter fields $V_1$–$V_3$ of shutter unit 7 is done by a microprocessor 8 that is connected to the shutter unit by a control line 9. The outputs of camera sensor 2 are further connected to microprocessor 8. Depending on the received optical information, microprocessor 8 is also used for control of different actuators 10, 11, 12. Microprocessor 8 can also receive additional parameters necessary for evaluating the optical information. Microprocessor 8 can also receive additional information for control of shutter unit 7. This additional information received by microprocessor 8 is indicated by the term "INFO" in FIG. 1.

Figure 2:
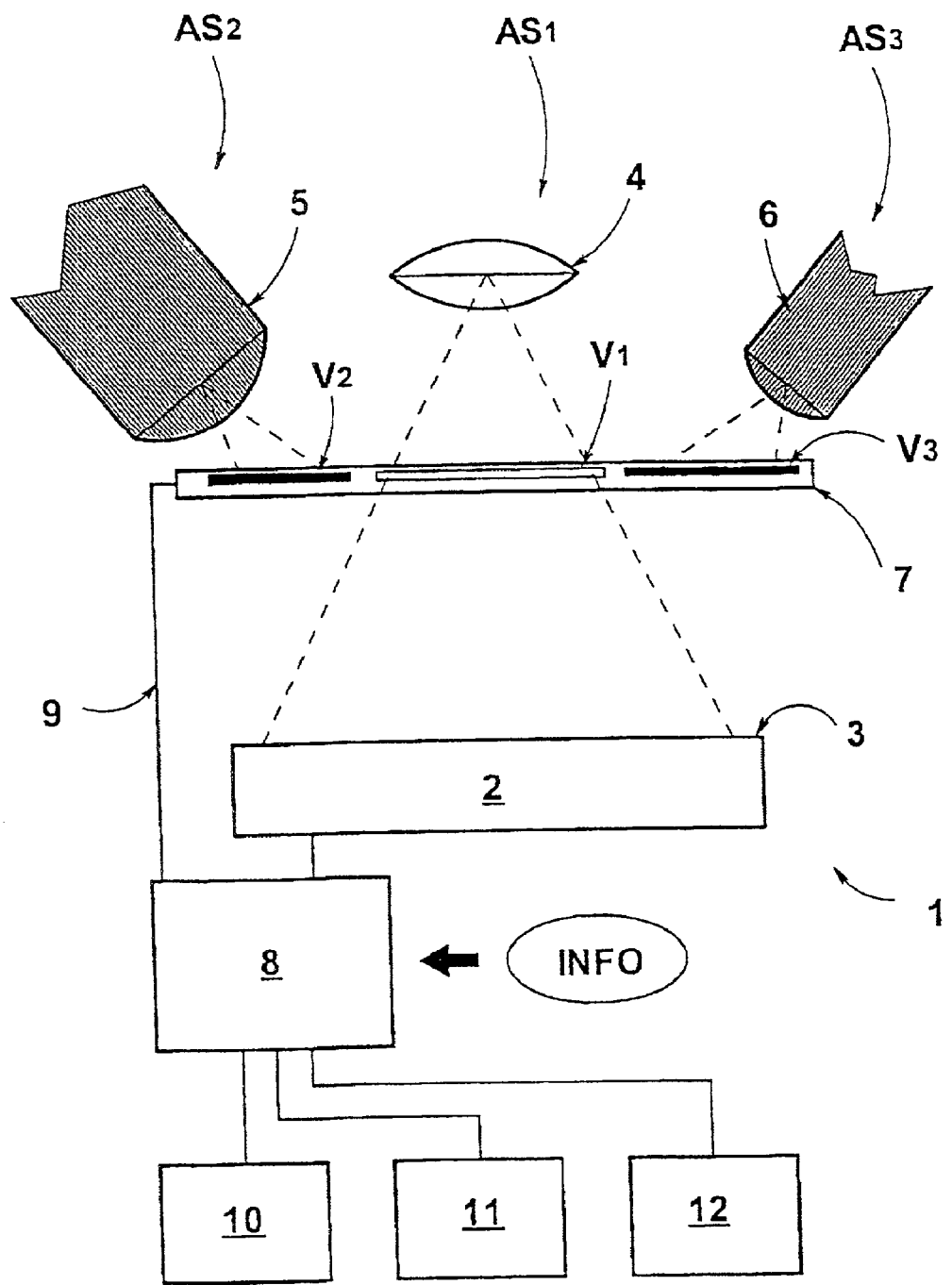
FIG. 2 illustrates the monitoring device of FIG. 1 during reception of optical information of one of the used imaging systems.

FIG. 2 shows monitoring device 1 of FIG. 1 during illumination of photosensitive surface 3 of camera sensor 2 by imaging system $AS_1$. Shutter field $V_1$ of shutter unit 7 allocated to imaging system $AS_1$ is in its light-transmitting mode. In contrast, the two additional shutter fields $V_2$ and $V_3$ of imaging systems $AS_2$ and $AS_3$ are in their light-blocking mode. Through corresponding control by microprocessor 8, either by time according to a predetermined clock or when necessary, shutter fields $V_1$ and $V_3$ are set for light transmission and the other shutter fields are switched to a light-blocking position, respectively.

Figure 3:
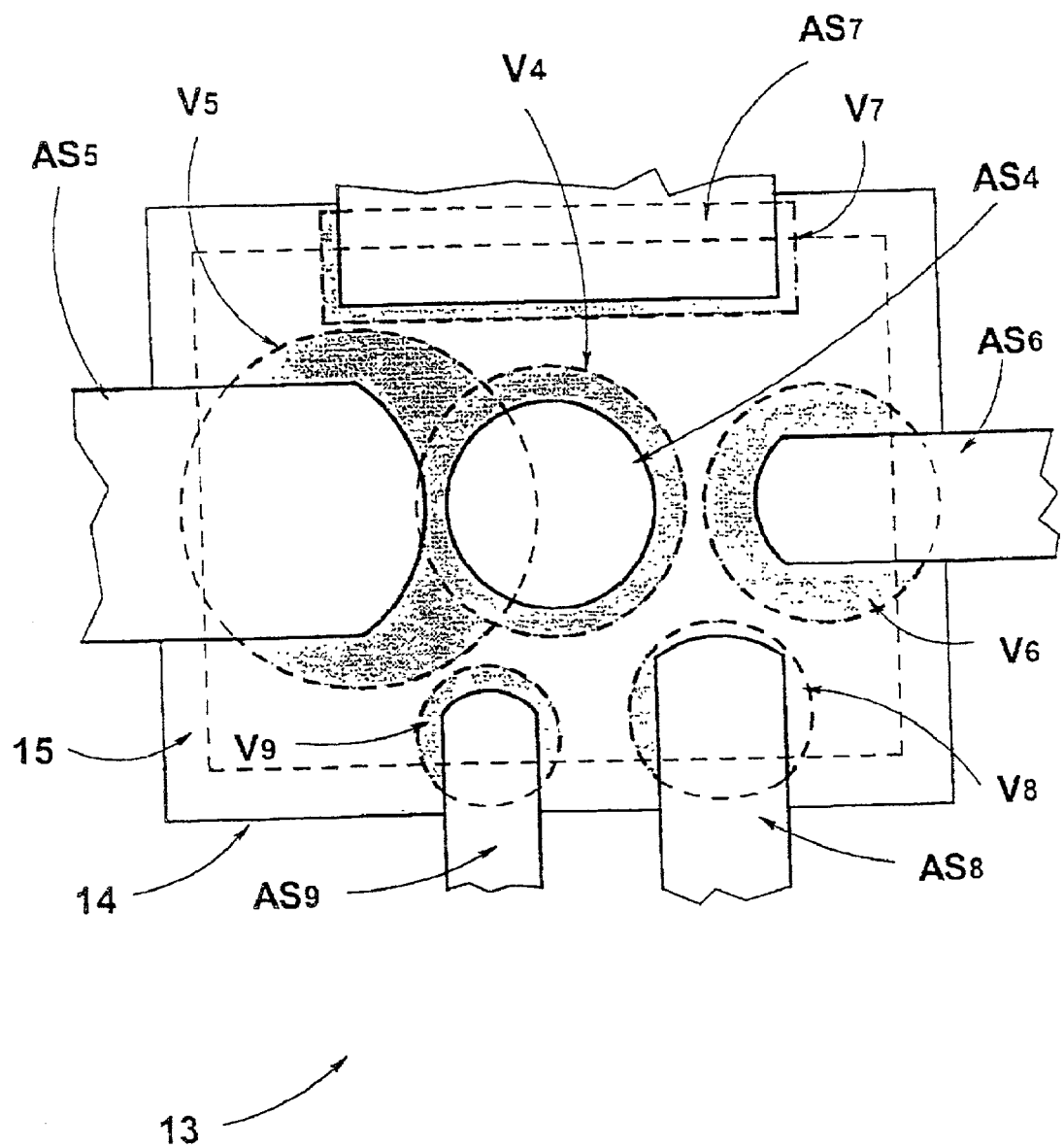
FIG. 3 illustrates a schematic layout of another optoelectronic monitoring device.

According to a layout form, another optoelectronic monitoring device 13 is shown schematically in FIG. 3. Monitoring device 13 is configured like monitoring device 1, wherein in contrast with monitoring device 1 of FIGS. 1 and 2, monitoring device 13 includes six imaging systems $AS_4$–$AS_9$. These imaging systems $AS_4$–$AS_9$ can be image-forming systems, e.g., the imaging systems $AS_4$–$AS_5$ and $AS_8$, and light-transmitting systems, such as the imaging systems $AS_7$ and $AS_9$. A shutter field $V_4$–$V_9$ in a shutter unit 14 is allocated to each imaging system, and these shutter fields $V_4$–$V_9$ can be controlled independently of each other. In particular, shutter fields $V_4$ and $V_5$, which partially overlap, should be pointed out. Such overlap can be provided when imaging systems $AS_4$ and $AS_5$ allocated to these shutter fields $V_4$ and $V_5$, respectively, are not simultaneously imaged on the photosensitive surface of camera sensor 15. The common shutter field region is correspondingly added, on the one hand, to shutter field $V_4$, and on the other hand, to shutter field $V_5$.

To enhance the imaging systems that supply such a device, the surface of the shutter unit facing the camera sensor can be coated with a light-reflecting layer that is formed, e.g., so that the imaging systems can image on the photosensitive surface of the camera sensor, and the optical information from the imaging systems is reflected from this deposited bottom side of the shutter unit. An individual shutter unit is also allocated to each of these additional imaging systems. The deposition on the bottom side of the shutter unit is formed so that light transmitted from above can pass through the coating.

In an expansion of such a configuration, the top side of the shutter unit facing the photosensitive surface of the camera sensor is coated overall or also in segments with an electrochromic layer, so that through corresponding control of the electrochromic segments, the reflective properties can be obtained. Thus, this layer or these segments serve both for light guidance and also as a shutter. Such a shutter unit is advantageously designed with multiple layers, wherein there is a shutter unit plane for the transmitted light beam paths and the additional shutter unit plane for the optical information guided by reflection to the camera sensor.

Figure 4:
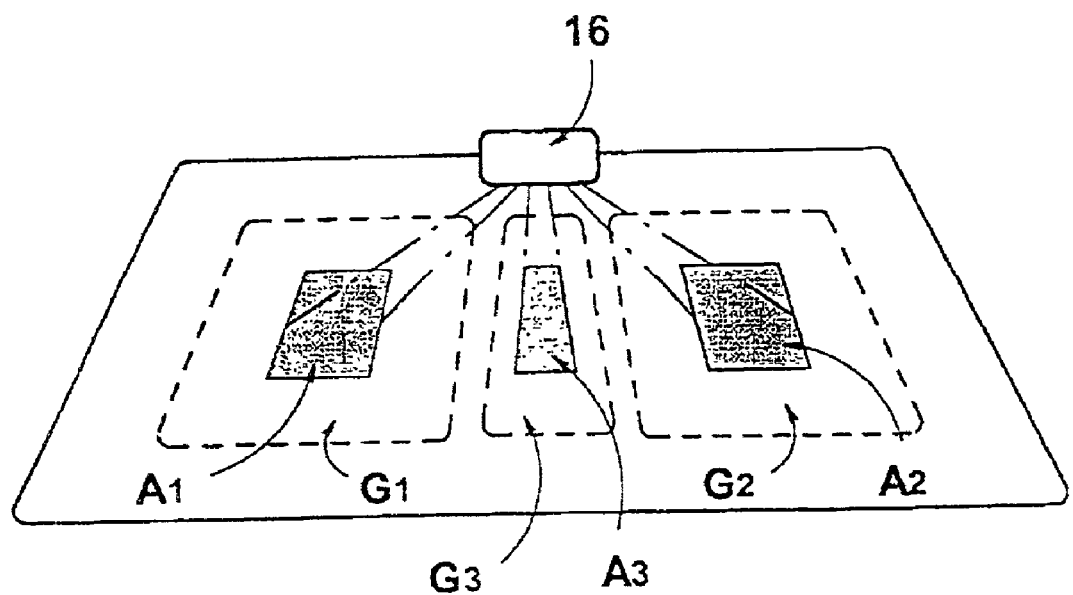
FIG. 4 illustrates an optoelectronic monitoring device used as a rain sensor for a motor vehicle.

FIG. 4 shows another monitoring device 16 that is arranged as a rain sensor for looking at three different windshield sections $A_1$, $A_2$, and $A_3$. The viewed windshield sections $A_1$–$A_3$ are components of different fields of vision, wherein the primary field of vision of the driver is indicated by the reference symbol $G_1$, the primary field of vision of the passenger is indicated by the reference symbol $G_2$, and the secondary field of vision between the two fields of vision $G_1$ and $G_2$ is indicated by the reference symbol $G_3$. A detection unit 17 includes three imaging units that are each arranged to view one of the windshield sections $A_1$, $A_2$, or $A_3$. The imaging units image the corresponding windshield section $A_1$, $A_2$, or $A_3$ on the photosensitive surface of a camera sensor that is common for all of the imaging units. In the beam path of each imaging unit there is a light switch so that the camera sensor can be illuminated selectively by one of the three imaging units. A liquid-crystal shutter segmented in three parts is used as the light switch.

Thus it is apparent that there has been provided, in accordance with the present invention, an optoelectronic monitoring device for a motor vehicle that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An optoelectronic monitoring device for a motor vehicle, the device comprising:
    a plurality of imaging systems, each imaging system operable for outputting a respective light beam in order to monitor a respective object;
    a sensor arranged relative to the imaging systems such that the light beams outputted by the imaging systems are incident to the sensor, the sensor outputting a sensor signal indicative of light received by the sensor;
    a shutter unit having a plurality of shutter fields, the shutter fields being switchable between light-transmitting and light-blocking modes, each shutter field being arranged between a respective imaging system and the sensor;
    wherein each shutter field allows light from the light beam outputted from the respective imaging system to be received by the sensor when the shutter field is in the light-transmitting mode;
    wherein each shutter field blocks the light beam outputted from the respective imaging system from being received by the sensor when the shutter field is in the light-blocking mode; and
    a controller which controls the shutter fields such that only one of the shutter fields is in the light-transmitting mode at any one time, wherein the controller processes the sensor signal in order to determine conditions of the objects being monitored by the imaging systems.

2. The device of claim 1 wherein:
    the controller controls the shutter fields electrically by electro-optical means.

3. The device of claim 1 wherein:
    the sensor is a two-dimensional sensor array.

4. The device of claim 1 wherein:
    the shutter unit is a liquid-crystal shutter unit.

5. The device of claim 1 wherein:
    the shutter unit is an electro-chromic shutter unit.

6. The device of claim 1 wherein:
    the controller controls an actuator associated with an object being monitored by an imaging system as a function of the determined conditions of the object.

7. An optoelectronic monitoring device for a motor vehicle, the device comprising:
    a plurality of imaging systems, each imaging system operable for outputting a respective light beam in order to monitor a respective object;
    a sensor arranged relative to the imaging systems such that the light beams outputted by the imaging systems are incident to respective regions of the sensor, wherein at least two of the sensor regions overlap one another such that the light beams outputted from at least two of the imaging systems are incident to the overlapped sensor regions, the sensor outputting a sensor signal indicative of light received by the sensor;
    a shutter unit having a plurality of shutter fields, the shutter fields being switchable between light-transmitting and light-blocking modes, each shutter field being arranged between a respective imaging system and the sensor;
    wherein each shutter field allows light from the light beam outputted from the respective imaging system to be received by the sensor when the shutter field is in the light-transmitting mode;
    wherein each shutter field blocks the light beam outputted from the respective imaging system from being received by the sensor when the shutter field is in the light-blocking mode; and
    a controller for controlling the shutter fields such that each sensor region is allowed to receive light from the light beam outputted by only one imaging system at any one time, wherein the controller processes the sensor signal in order to determine conditions of the objects being monitored by the imaging systems.

8. The device of claim 7 wherein:
    the controller controls the shutter unit electrically by electro-optical means.

9. The device of claim 7 wherein:
    the sensor is a two-dimensional sensor array.

10. The device of claim 7 wherein:
    the size of the sensor is determined by the largest sensor region associated with an imaging system, wherein the other sensor regions are contained within the largest sensor region.

11. The device of claim 7 wherein:
    the shutter unit is one of a liquid-crystal shutter unit and an electro-chromic shutter unit.

12. The device of claim 7 wherein:
    the controller controls an actuator associated with an object being monitored by an imaging system as a function of the determined conditions of the object.

* * * * *